United States Patent
Johnson et al.

(10) Patent No.: US 7,195,552 B1
(45) Date of Patent: *Mar. 27, 2007

(54) CONVEYOR CHAIN

(75) Inventors: Noel R. Johnson, Stoughton, WI (US); David Norby, Madison, WI (US); Wendell J. Holl, Lodi, WI (US); Andi Mikelsons, Middleton, WI (US); David Lukens, Prairie Du Sac, WI (US); Nicholas Cable, Lodi, WI (US); Anthony Renger, Loganville, WI (US); Robert E. Hanson, Madison, WI (US)

(73) Assignee: Alkar-RapidPak, Inc., Lodi, WI (US)

( * ) Notice: Subject to any disclaimer, the term of this patent is extended or adjusted under 35 U.S.C. 154(b) by 692 days.

This patent is subject to a terminal disclaimer.

(21) Appl. No.: 10/368,518

(22) Filed: Feb. 18, 2003

Related U.S. Application Data

(63) Continuation of application No. 10/185,997, filed on Jun. 27, 2002, now Pat. No. 6,523,462.

(51) Int. Cl.
*A22C 15/00* (2006.01)
(52) U.S. Cl. ...................................................... 452/51
(58) Field of Classification Search ................ 198/833, 198/330, 687, 817, 681, 339.1
See application file for complete search history.

(56) References Cited

U.S. PATENT DOCUMENTS

| | | | |
|---|---|---|---|
| 1,907,894 A | 5/1933 | Stevens et al. | |
| 3,533,495 A | 10/1970 | Wallace | |
| 4,361,220 A * | 11/1982 | Kraft | 198/330 |
| 4,401,018 A | 8/1983 | Berry | |
| 4,501,351 A * | 2/1985 | Tracy | 198/867.15 |
| 4,753,216 A | 6/1988 | Nolte | |
| 4,770,291 A * | 9/1988 | Shaw | 198/851 |
| 5,271,316 A | 12/1993 | Wisting | |
| 5,699,723 A | 12/1997 | Schliesser et al. | |
| 5,730,649 A | 3/1998 | Schliesser et al. | |
| 5,924,918 A | 7/1999 | Wagner et al. | |
| 5,927,472 A | 7/1999 | Neef et al. | |
| 6,056,636 A | 5/2000 | Cody et al. | |
| 6,086,469 A | 7/2000 | Cody et al. | |
| 6,125,991 A * | 10/2000 | Veldkamp et al. | 198/678.1 |
| 6,179,701 B1 | 1/2001 | Tieleman | |
| 6,257,974 B1 | 7/2001 | Basile, II | |
| 6,290,591 B1 | 9/2001 | Hergott et al. | |
| 6,419,077 B1 | 7/2002 | White et al. | |
| 6,523,462 B1 * | 2/2003 | Johnson et al. | 99/443 C |

\* cited by examiner

*Primary Examiner*—Thomas Price
(74) *Attorney, Agent, or Firm*—Andrus, Sceales, Starke & Sawall, LLP

(57) ABSTRACT

A food processing system for an elongated strand of food product, such as hot dogs or sausage links, provides aligned orientation of conveyor hooks and identical arrival time spacing between adjacent hooks at a reference loading point at a strand producing machine discharge station.

22 Claims, 12 Drawing Sheets

CONVEYOR CHAIN

CROSS-REFERENCE TO RELATED APPLICATION

This application is a continuation of U.S. patent application Ser. No. 10/185,997, filed Jun. 27, 2002 now U.S. Pat. No. 6,523,462.

BACKGROUND AND SUMMARY

The invention relates to food processing systems for processing an elongated strand of food product in a casing having tubular segments serially joined by pinched connection segments, e.g. hot dogs, sausage links, etc.

The invention arose during continuing development efforts directed toward subject matter such as shown in U.S. Pat. Nos. 6,086,469 and 6,056,636. In such systems, strands of sausage are made on high speed machines by extruding meat emulsion into an elongated casing. The meat-filled casing is then twisted to create sausage links. The linked strand is then discharged from the sausage making machine. Loops of sausage comprising a plurality of links are deposited on moving hooks of a conveyor. The ultimate length of a given strand is determined by the length of the casing being filled. When a casing has been filled, the sausage making machine is stopped; the casing is tied off or closed to prevent any meat emulsion from exiting the rear most end of the casing; a new casing is then placed in position to be filled; the machine is restarted and the cycle repeats itself. The linked and looped sausage strand or strands are periodically removed from the conveyor or otherwise transported to a food processing station which normally cooks, smokes or treats the sausage strand before packaging for final delivery to the consumer. With sausage machines creating up to 30,000 sausages per hour, the handling of the production of even a single machine is a significant task. Any inefficiency in the process translates into increased cost of production which is reflected in the price of the products to the consumer.

The present invention is directed to improvements in the above noted system, and in particular to providing alignment of the twisted pinched connection segment between tubular segments of the strand and the hooks on the conveyor receiving such strand from the strand producing machine. This is desired to ensure that the strand lay across the hook at a pinched connection segment between tubular segments, FIG. 20; and prevent the meat casing from laying across the hook at a midpoint of the tubular segment, FIG. 21, which would deform the hot dog, sausage link or the like.

DETAILED DESCRIPTION OF THE INVENTION

Figure 1:
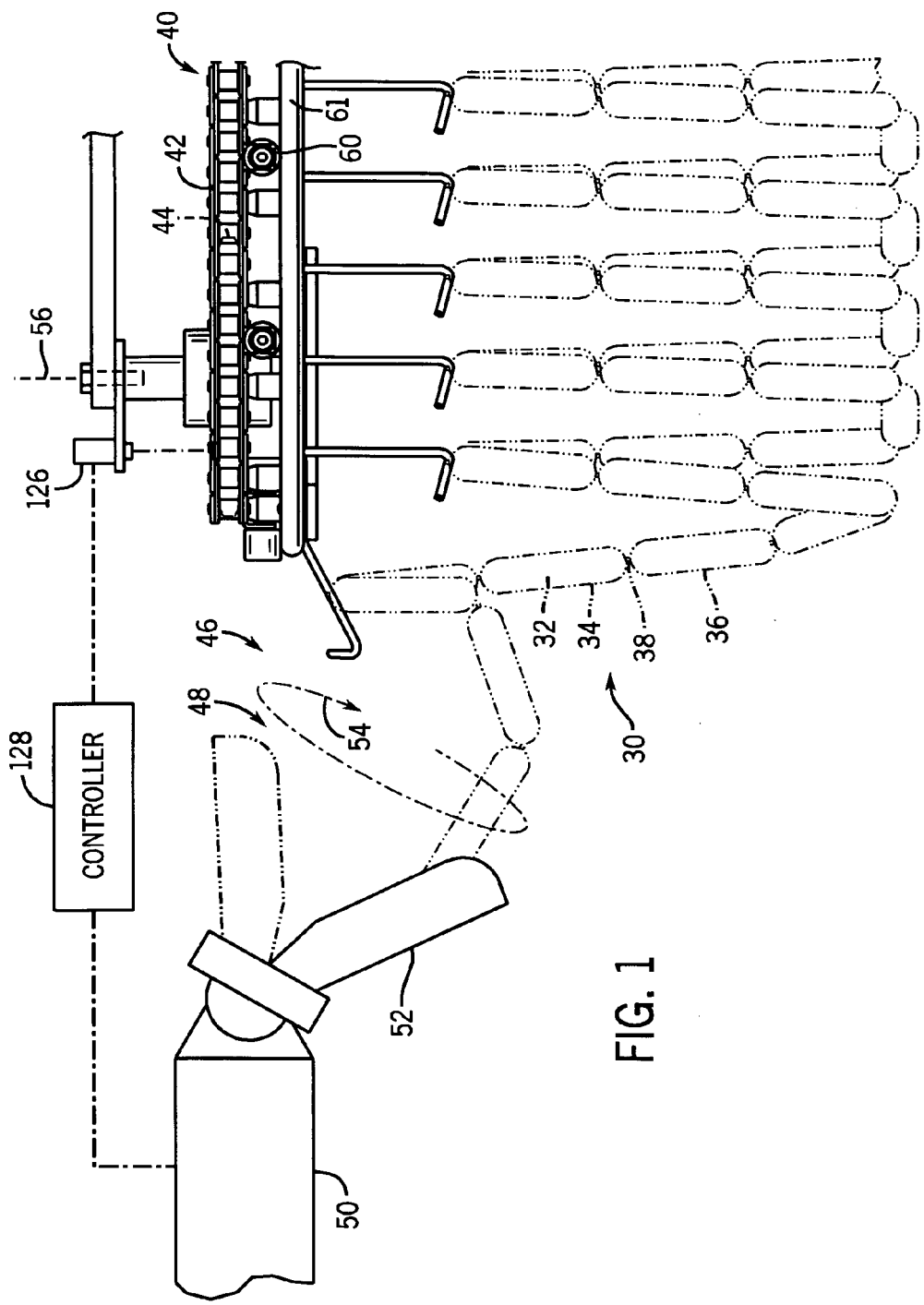
FIG. 1 is a side elevation view of a system for processing an elongated strand of food product in accordance with the invention.
Figure 2:
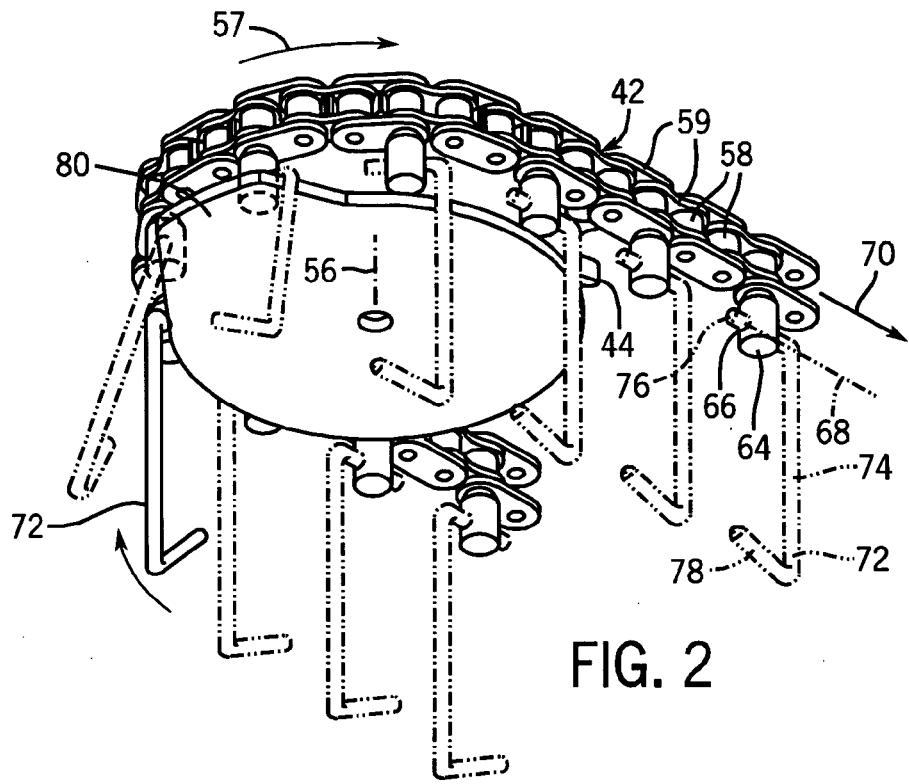
FIG. 2 is a perspective view of a portion of the system of FIG. 1 illustrating operation.

FIG. 1 shows a food processing system 30 like that shown in above noted U.S. Pat. Nos. 6,086,469 and 6,056,636, incorporated herein by reference. The system processes an elongated strand 32 of food product in a casing 34 having tubular segments 36 serially joined by twisted pinched connection segments 38. The system includes a conveyor 40 having a chain 42 traversing in a horizontal plane around a sprocket 44, FIGS. 2, 7, at a strand loading station 46, FIG. 1, adjacent a discharge station 48 of a strand producing machine 50 having discharge looper horn 52 which rotates in a counterclockwise path as shown at 54, as viewed from the right. Sprocket 44 rotates about a vertical axis 56, and rotates counterclockwise as shown at 57, FIG. 2, as viewed from above. Chain 42 has a plurality of chain pins 58 connected by respective links such as 59. Rollers such as 60, FIGS. 1, 8–10, are mounted to selected lower chain links for rolling along support rails 61. The structure and operation described thus far is in the prior art, for example as in the incorporated '469 and '636 patents. Chain 42 is preferably a #60 stainless steel roller chain, 0.75" pitch, and carries the food product to one or more downstream processing stations, such as a cooking oven, and then is unloaded, and returns to loading station 46.

Figure 3:
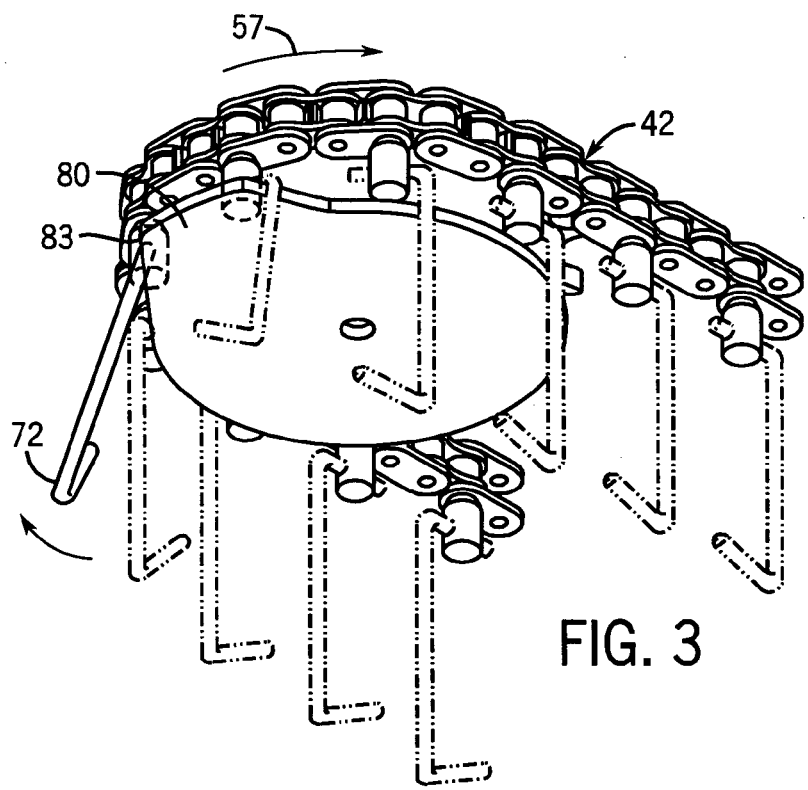
FIG. 3 is like FIG. 2 and shows further sequential operation.
Figure 4:
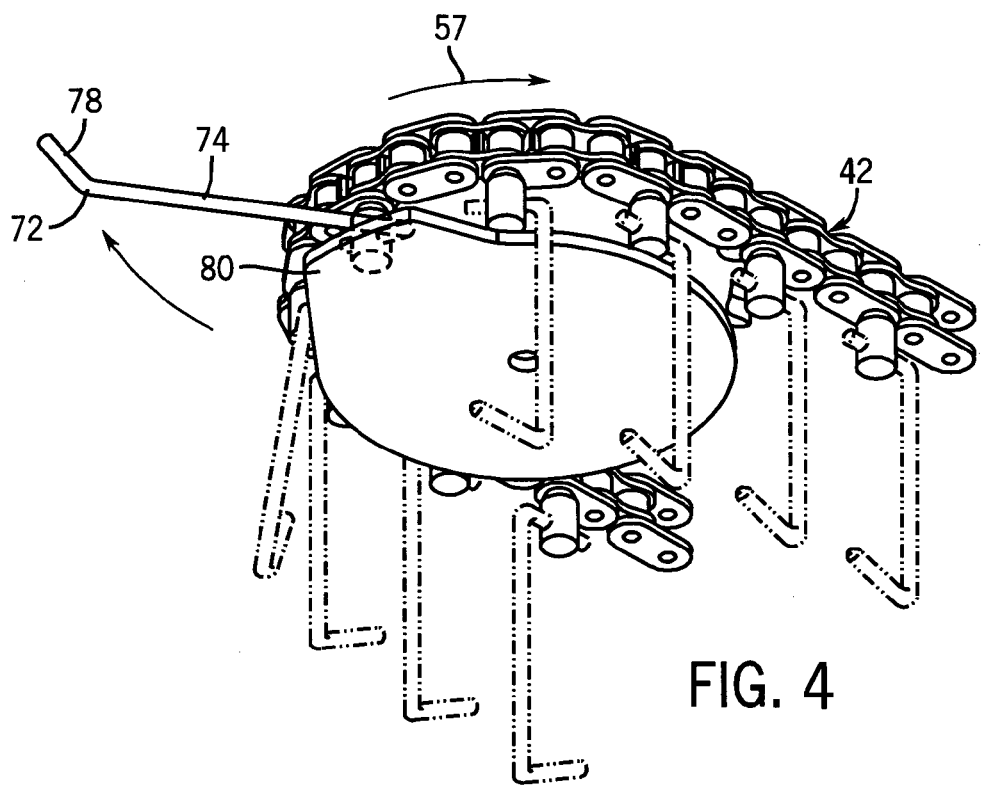
FIG. 4 is like FIG. 3 and shows further sequential operation.
Figure 5:
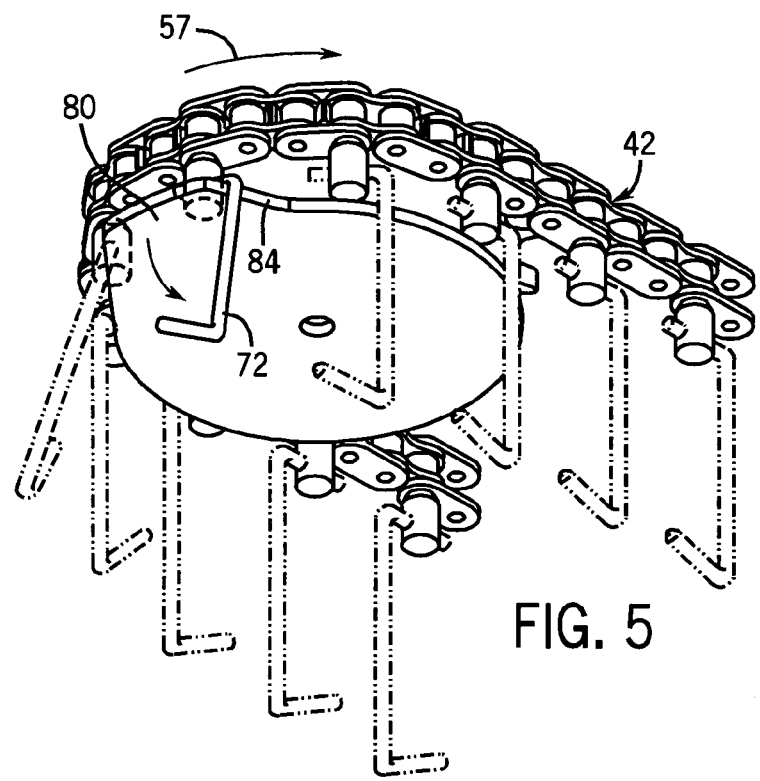
FIG. 5 is like FIG. 4 and shows further sequential operation.
Figure 6:
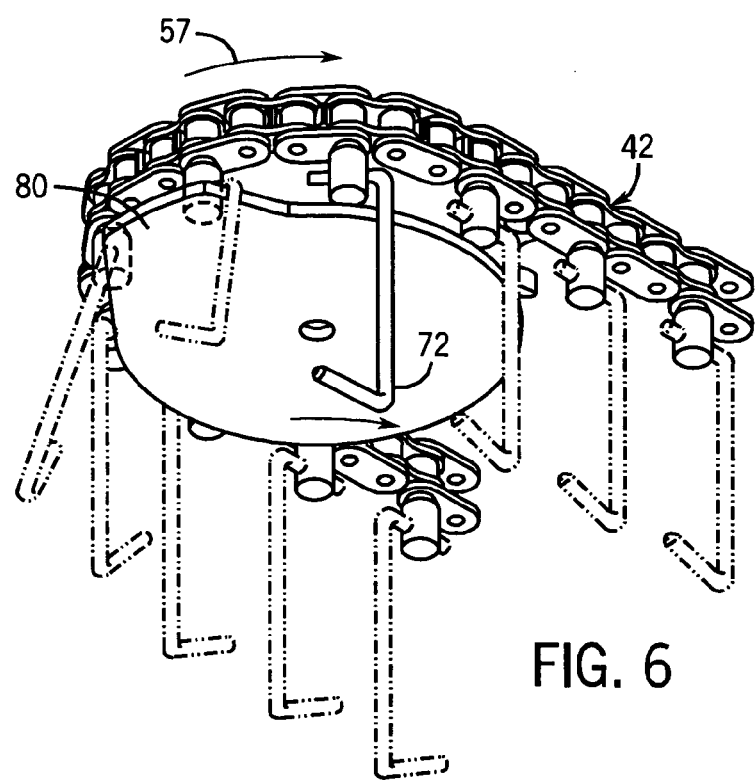
FIG. 6 is like FIG. 5 and shows further sequential operation.

Some of the chain pins have respective stainless steel studs such as 64 mounted thereto, preferably by welding to the link therebelow. Each stud has a bore 66 therethrough defining a pivot axis 68 parallel to the direction of chain travel 70. A plurality of hooks 72 are provided, each having a normally vertical shank 74 with an upper end 76 extending laterally from vertical shank 74 into bore 66 in pivotal relation, and having a lower distal hook end 78. A cam 80 at the loading station cammingly engages the hook at vertical shank 74 and cams the hook upwardly to an upwardly cammed pivoted position, FIG. 4, receiving strand 32 at a reference loading point 82, FIGS. 11, 13, at the loading station. This is sequentially illustrated in FIGS. 2–6, wherein in FIG. 2 solid line hook 72 is initially in a vertically depending position, and then in FIG. 3 begins to pivot upwardly as it is cammed at leading cam edge 83 of cam 80, and then in FIG. 4 the shank 74 is substantially horizontal, and then in FIG. 5 begins to pivot back downwardly along trailing cam edge 84 of cam 80, and then in FIG. 6 returns to vertical. The camming action of hooks 72 is like the prior art, except for the mounting of the hooks. In the prior art, a plastic stud similar to stud 64 is mounted to a lower chain link 59 between chain pins, not to a chain pin.

Figure 11:
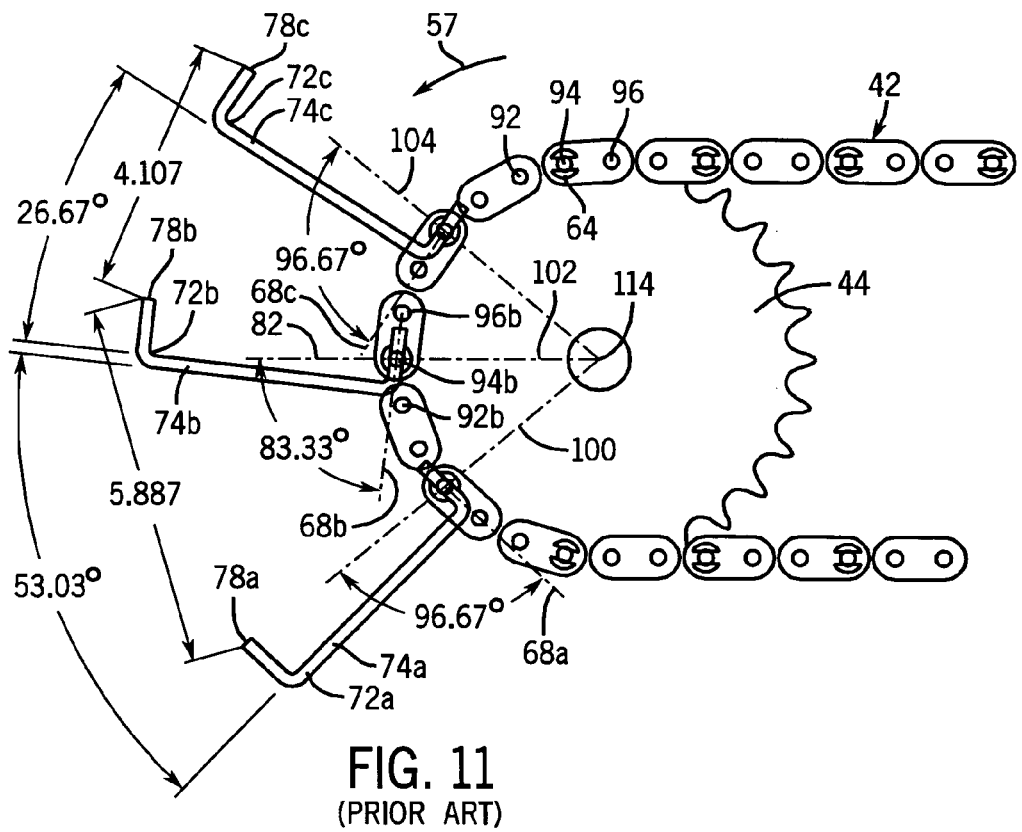
FIG. 11 is a schematic plan view illustrating problems encountered in the absence of the present invention.

FIG. 11 schematically illustrates operation of the above described system but without the benefit of the present invention. The chain has a plurality of groups of chain pins, each group having a leading pin 92, a middle pin 94, and a trailing pin 96. The studs are connected to the middle pins, for example as shown at stud 64 connected to middle pin 94. As the chain traverses around the sprocket as shown at arrow 57, the orientation of the hooks as they arrive at reference loading point 82 is not consistent, and furthermore the arrival time spacings between adjacent hooks is not consistent. FIG. 11 shows hook shank 74b in its upwardly pivoted horizontal position. FIG. 11 shows the projections of hook shanks 74a and 74c as if they were pivoted to their upward horizontal position, for illustration and comparison purposes. As shown, the angular distance between shanks 74a and 74b is 53.03 degrees, while the angular distance between shanks 74b and 74c is 26.67 degrees. The linear distance between hook ends 78a and 78b is 5.887 inches, while the linear distance between hook ends 78b and 78c is 4.107 inches. The angle between radial line 100 and pivot axis 68a is 96.67 degrees. The angle between radial line 102 and pivot axis 68b is 83.33 degrees. The angle between radial line 104 and pivot axis 68c is 96.67 degrees. This is undesirable because of the noted inconsistent orientations of shanks 74 as they arrive at reference loading point 82, and the inconsistent arrival time spacings thereof. One solution to the noted differential spacing problem would be to vary the speed of conveyor 40 and/or the discharge rate of strand producing machine 50 hook to hook, for example by increasing the speed of conveyor 40 or decreasing the discharge rate of machine 50 after hook 72a passes reference loading point 82 to accommodate the greater spacing to the next hook 72b, and then decreasing the speed of conveyor 40 or increasing the discharge rate of machine 50 after hook 72b passes reference loading point 82 to accommodate the shorter distance to the next hook 72c. The present invention addresses and solves this differential spacing problem in a much simpler manner.

Figure 20:
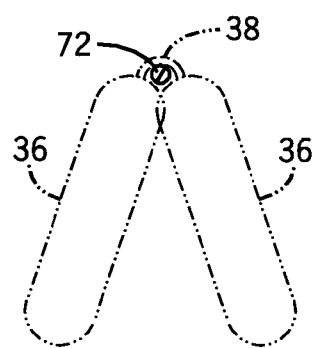
FIG. 20 schematically shows the desired loaded condition.
Figure 21:
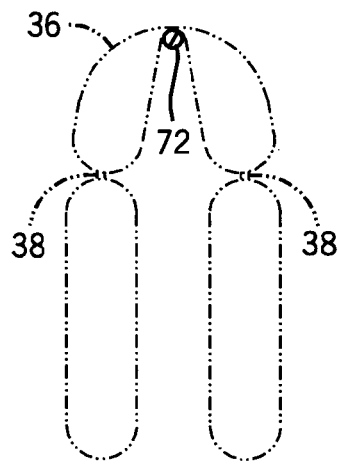
FIG. 21 schematically shows an undesired loaded condition.
Figure 12:
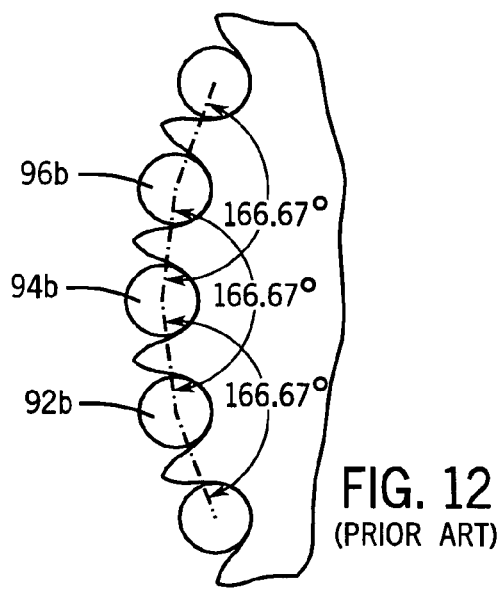
FIG. 12 shows a portion of the structure of FIG. 11.
Figure 13:
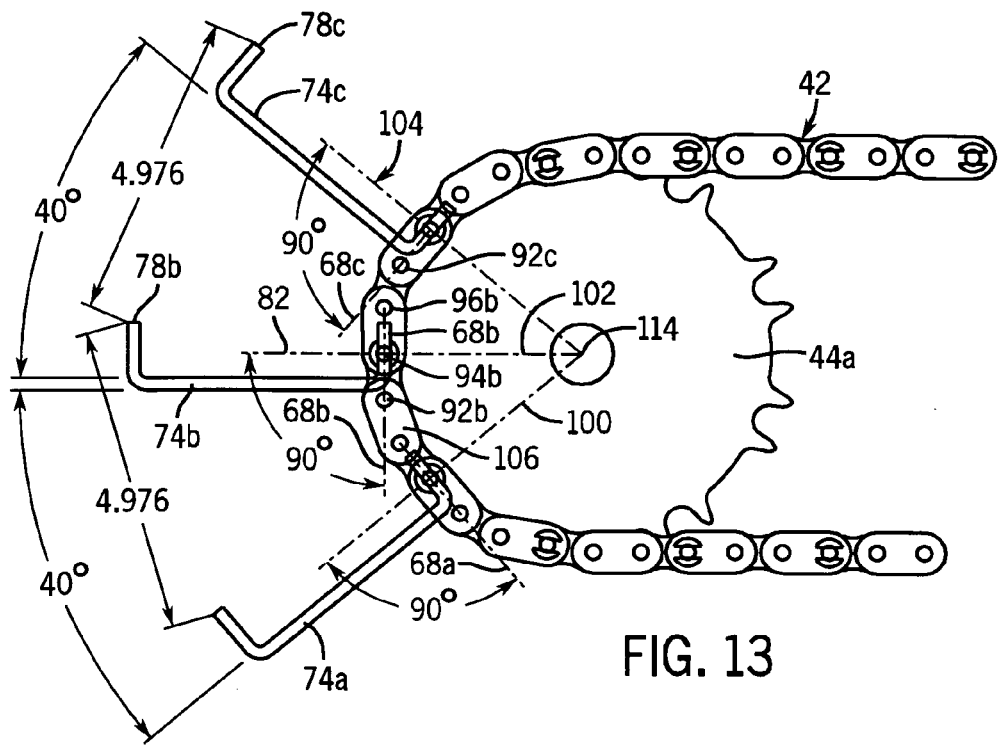
FIG. 13 is a schematic plan view like FIG. 11 but illustrating the present invention.
Figure 14:
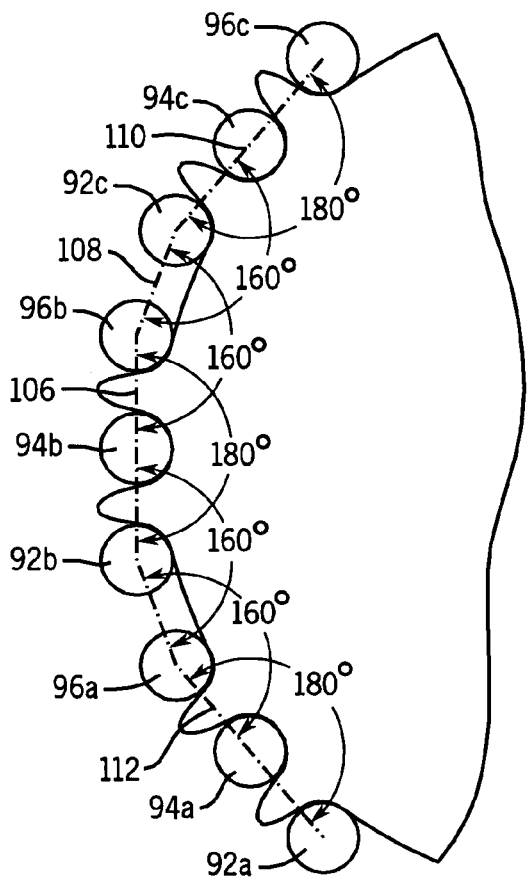
FIG. 14 is like FIG. 12 but illustrates the present invention.

FIG. 13 shows the present invention and illustrates the spacing equalization afforded thereby, including identical orientation of the hooks at reference loading point 82, and presentment of the hooks at the reference loading point 82 at identical arrival time spacings between adjacent hooks for a given constant rotation speed of sprocket 44, such that a respective pinched connection segment 38, FIG. 20, aligns with a respective hook without varying the speed of conveyor 40 nor the discharge rate of strand producing machine 50. In FIG. 13, the noted leading, middle and trailing chain pins of each group lie in a straight rectilinear line, including at the loading station, for example as shown at chain pins 92b, 94b, 96b lying in a straight rectilinear line 106 coincident with pivot axis 68b. In contrast, in FIG. 11 the counterpart pins 92b, 94b, 96b do not lie along a straight rectilinear line at the loading station. As shown in FIG. 13, the angular spacing between shanks 74a and 74b is 40 degrees, and the angular spacing between shanks 74b and 74c is 40 degrees. The linear displacement between hook ends 78a and 78b is 4.976 inches, and the linear spacing between hook ends 78b and 78c is 4.976 inches. The angle between radial line 100 and pivot axis 68a is 90 degrees. The angle between radial line 102 and pivot axis 68b is 90 degrees. The angle between radial line 104 and pivot axis 68c is 90 degrees. As shown in FIG. 14, chain pins 92b, 94b, 96b define a rectilinear line as shown at 106, wherein the angle between the center of the first and third chain pins 92b and 96b is 180 degrees. In contrast, in FIG. 12, corresponding chain pins 92b, 94b, 96b do not lie along a straight rectilinear line, and the angle between the center of first pin 92b and third pin 96b is not 180 degrees, but rather 166.67 degrees. Further in FIG. 14, third pin 96b of its respective group and first pin 92c of the next group define a rectilinear line 108 therebetween. The angle between lines 106 and 108 is 160 degrees. Chain pins 92c, 94c, 96c lie along a straight rectilinear line 110. The angle between lines 110 and 106 is 140 degrees. Chain pins 92a, 94a, 96a lie along straight rectilinear line 112.

Figure 15:
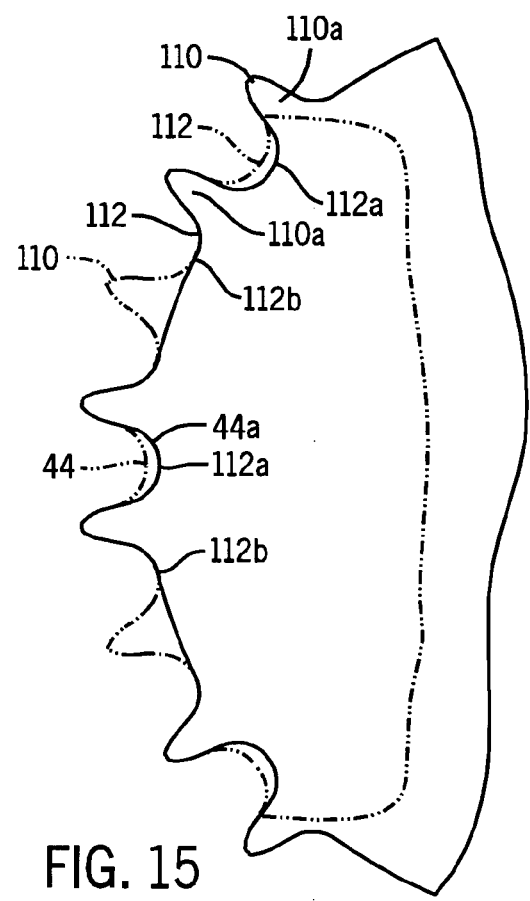
FIG. 15 is a schematic illustration overlying portions of FIGS. 11 and 13.
Figure 22:
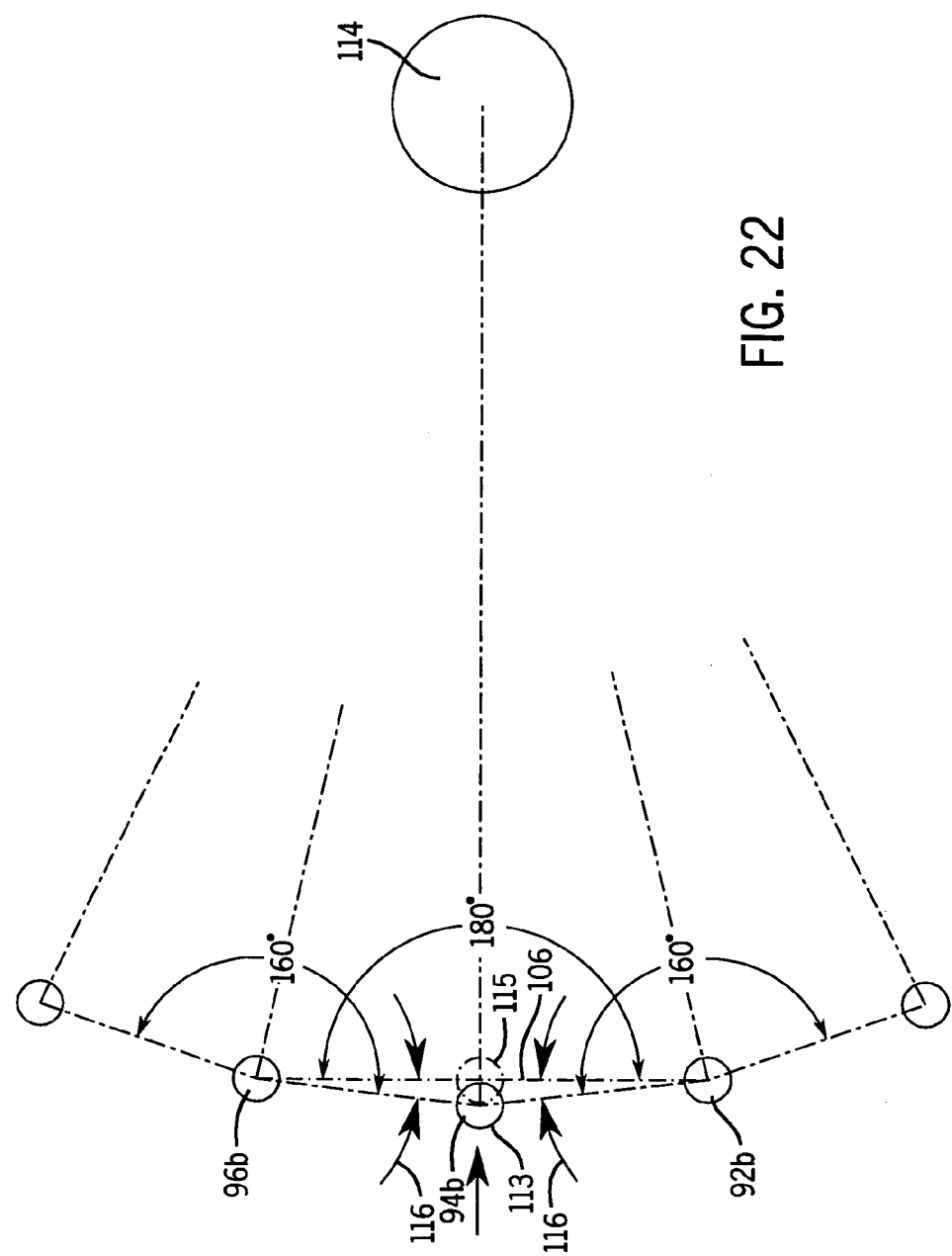
FIG. 22 is a further schematic illustration similar to FIG. 14 and further illustrating the invention.

The noted straight rectilinear lines 106, 110, 112, etc. are preferably provided by modifications of the sprocket 44. FIG. 15 shows in dashed line the sprocket 44 of FIG. 11, and shows in solid line at 44a the sprocket as modified in accordance with the present invention. Sprocket 44 has a plurality of teeth 110 separated by roots 112 and engaging the chain pins. Sprocket 44a likewise has a plurality of teeth 110a separated by roots and engaging the chain pins. In modified sprocket 44a, the roots 112a at the chain pins having a stud 64 have a deeper radial depth than the remaining roots 112b. The deeper radial depth at 112a seats chain pin 94b further rightwardly in FIG. 13 than in FIG. 11 toward the center 114 of the sprocket. In contrast, the root depth at 112 in FIG. 15 maintains the orientation of chain pin 94b as shown in FIG. 11. This is further illustrated in FIG. 22 wherein chain pin 94b of FIG. 11 is shown in solid line at position 113 as provided by root depth 112. In contrast, chain pin 94b of FIG. 13 is shown in dashed line in FIG. 22 at position 115 as provided by deeper root depth 112a of FIG. 15. The radially inward displacement from position 113 to position 115 is shown at 116.

Figure 16:
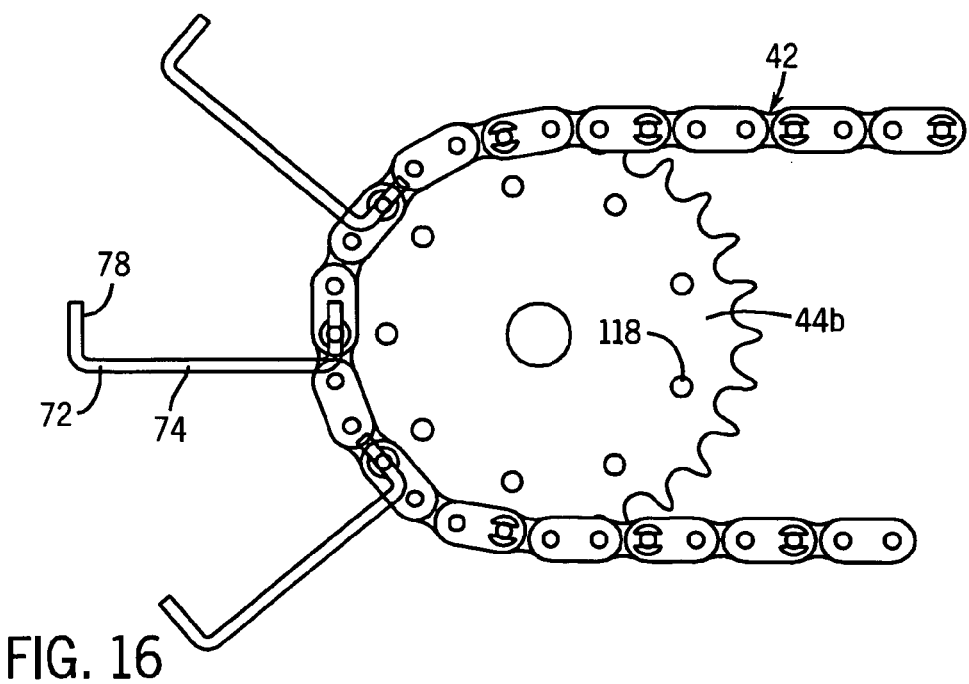
FIG. 16 is like FIG. 13 and shows an alternate embodiment.
Figure 17:
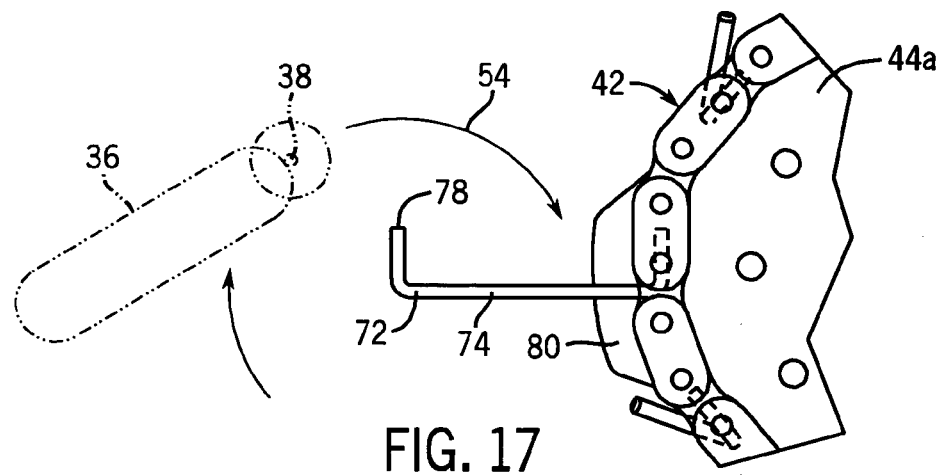
FIG. 17 shows a portion of FIG. 13 and illustrates loading.
Figure 18:
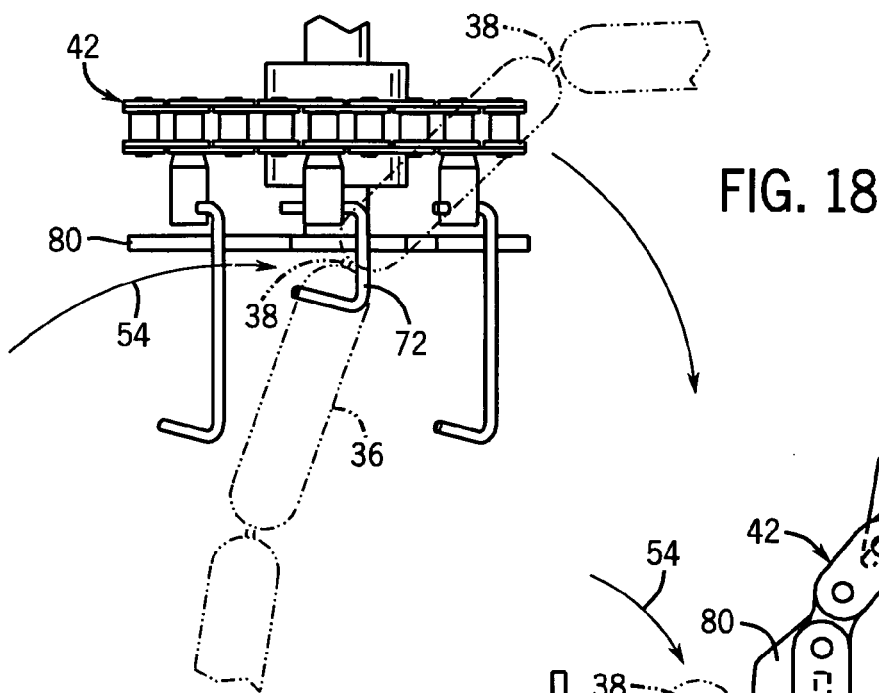
FIG. 18 is an end view further illustrating the loading of FIG. 17.
Figure 19:
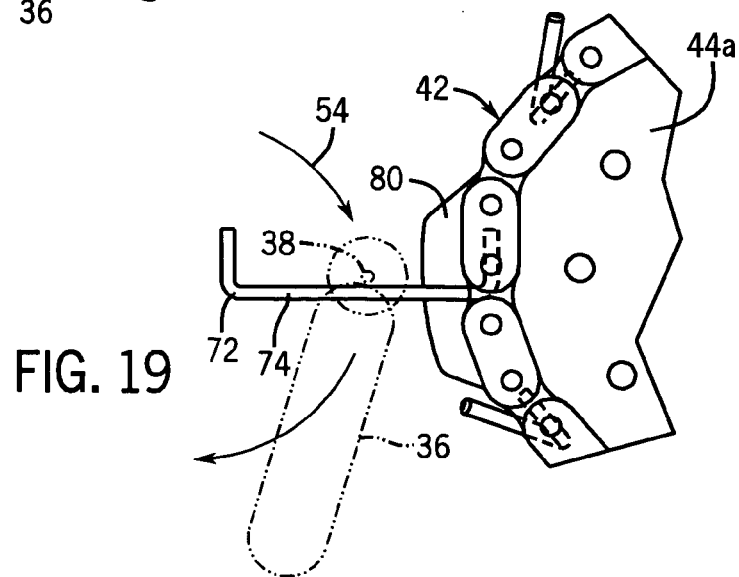
FIG. 19 is like FIG. 17 and shows the loaded condition.

In the preferred embodiment, sprocket 44a has a plurality of groups of roots, each group having a first root 112b, FIG. 15, receiving first and third chain pins such as 96b and 92c, FIG. 13, therein with no tooth therebetween, and a second root 112a receiving the second chain pin 94b therein. Root 112b has a greater circumferential width than 112a. Root 112a has a greater radial depth than root 112b. This skipped tooth arrangement provides easy orientation of the chain on the sprocket, i.e. chain pins having studs 64 go in the single root, while chain pins not having studs go in the double width root. In an alternate embodiment, as shown at sprocket 44b, FIG. 16, no teeth are skipped, and each root has the same width, and a marker or indicator such as 118 is provided corresponding to the deeper depth root for the chain pin with the stud 64.

Figure 7:
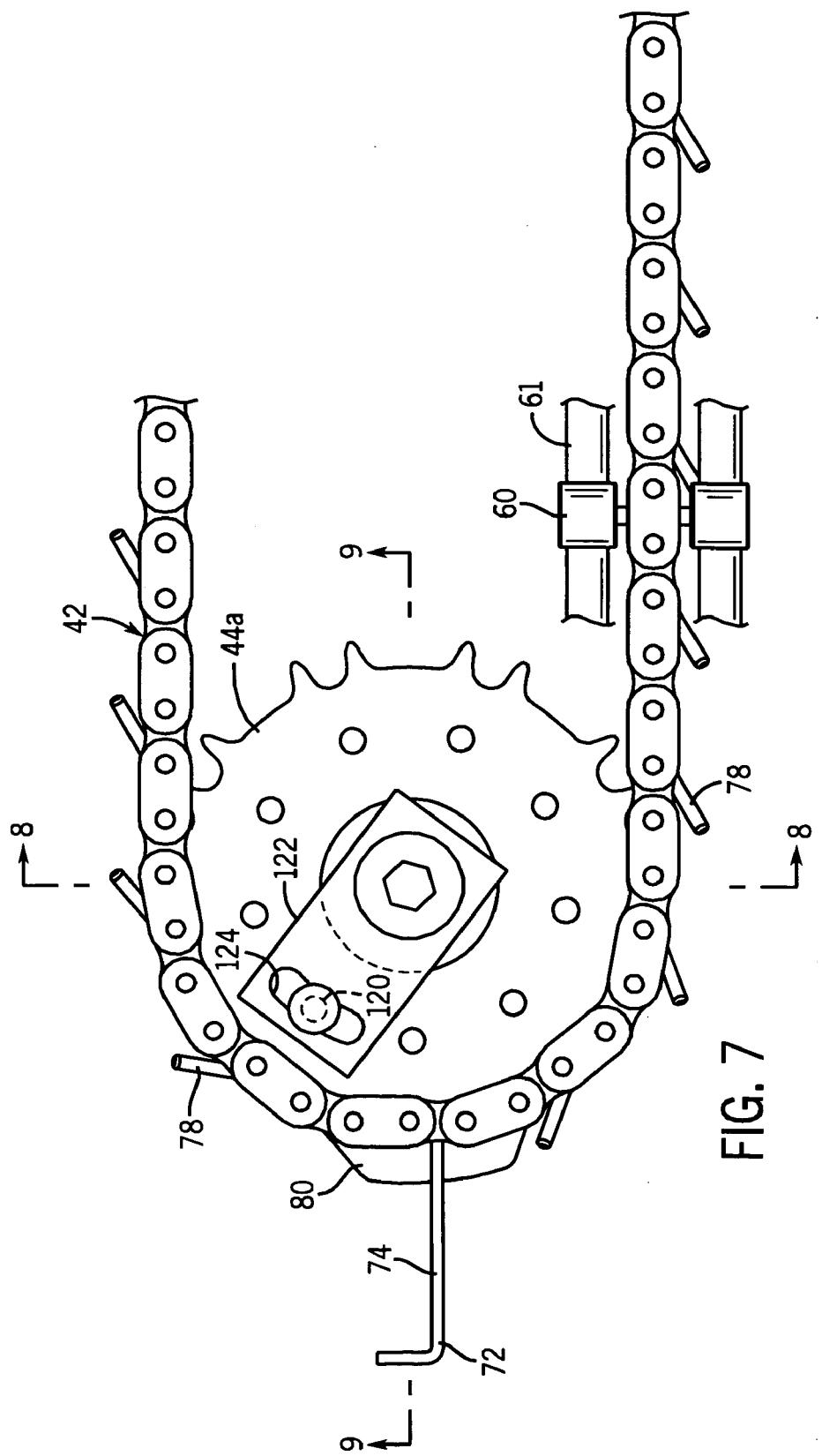
FIG. 7 is a top plan view of a portion of the system of FIG. 1.
Figure 8:
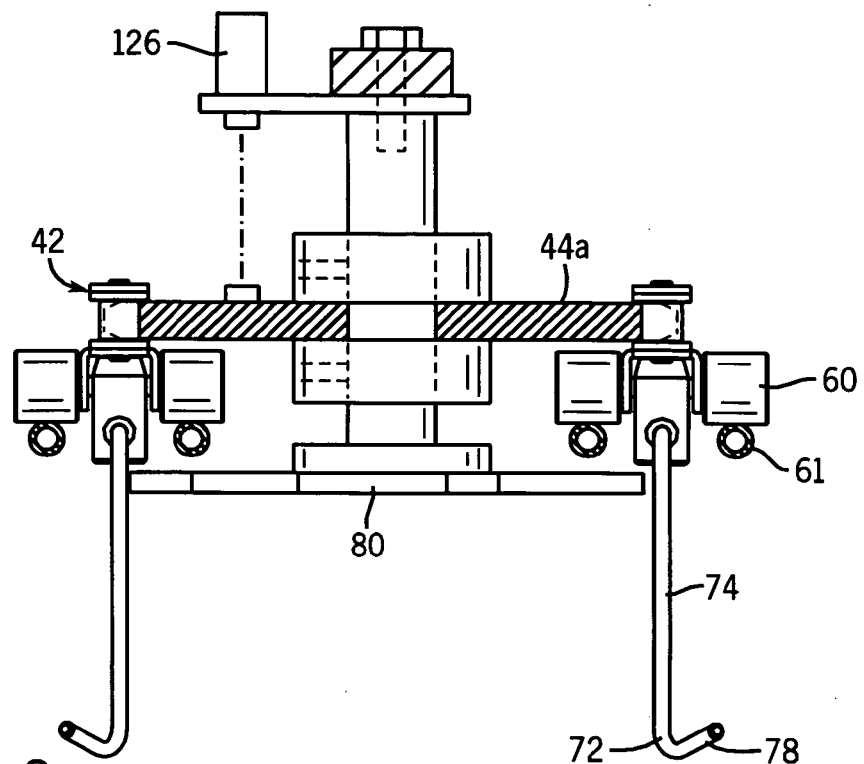
FIG. 8 is a sectional view taken along line 8—8 of FIG. 7.
Figure 9:
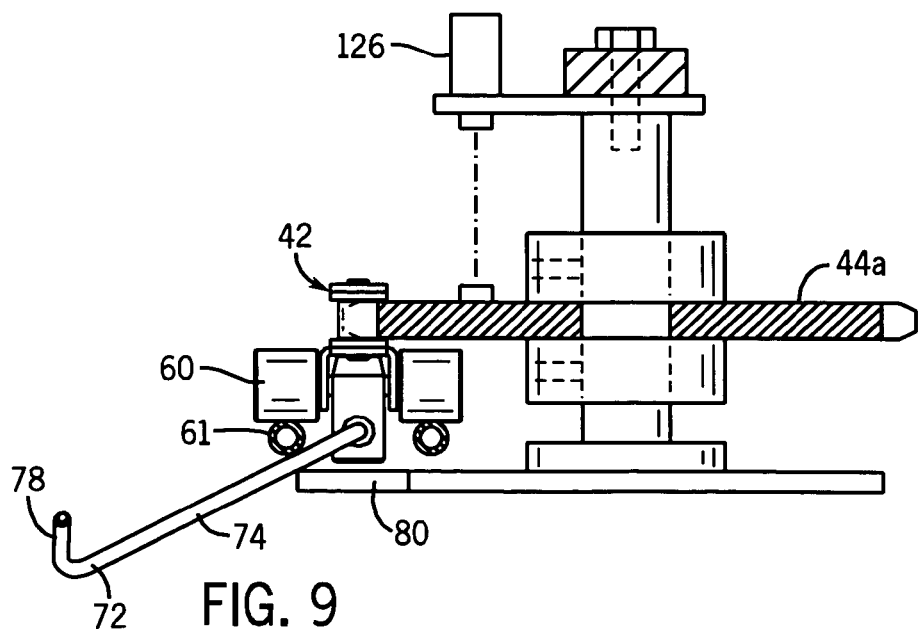
FIG. 9 is a sectional view taken along line 9—9 of FIG. 7.
Figure 10:
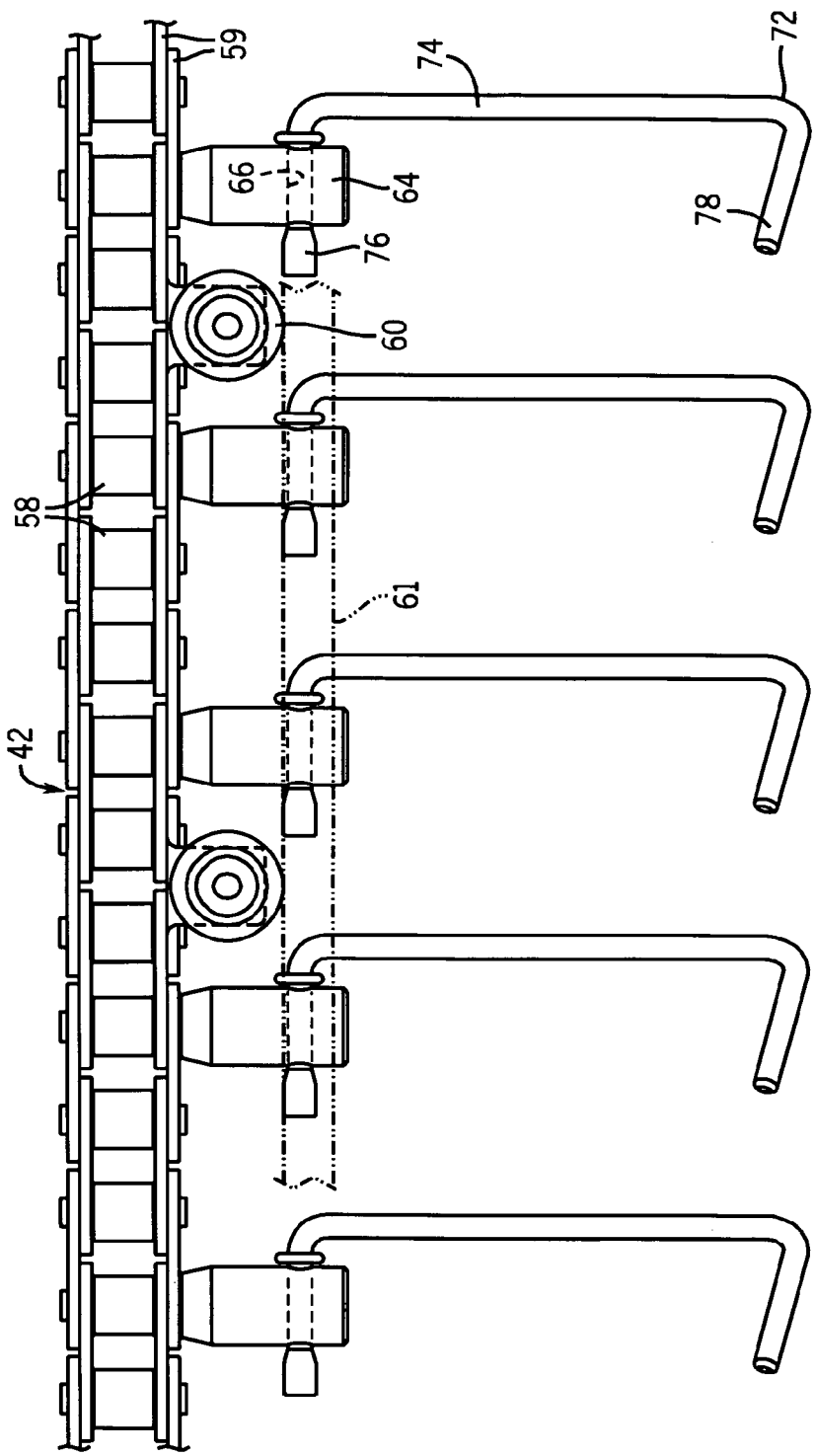
FIG. 10 is a side elevation view of a portion of the system of FIG. 1.

The precise alignment, orientation and spacing enabled by the invention facilitates loading of the strand onto the hooks as desired, FIGS. 17–20. The noted hook orientation mechanisms provided by the noted chain pin relation and sprocket modifications orient the hooks in identical orientations at reference loading point 82 and present the hooks at such reference loading point at identical arrival time spacings between adjacent hooks for a given constant rotation speed of the sprocket, such that a respective pinched connection segment 38 aligns with a respective hook along shank 74 in its upwardly cammed pivoted position at reference loading point 82 without varying the speed of conveyor 40 nor the discharge rate of strand producing machine 50. In further preferred form, a proximity sensor/reflector 120, FIG. 7, is adjustably mounted to sprocket 44*a* at adjustment plate 122 having arcuate slot 124 for passing beneath proximity signal sender 126, FIG. 1, for providing a feedback signal through controller 128 to strand producing machine 50 for indicating angular position of the sprocket for synchronizing alignment of the noted pinched connection segments and hooks.

It is recognized that various equivalents, alternatives and modifications are possible within the scope of the appended claims.

What is claimed is:

1. A conveyor chain for a system for processing an elongated strand of food product in a casing having tubular segments serially joined by pinched connection segments, said chain traversing in a horizontal plane around a sprocket at a strand loading station adjacent a discharge station of a strand producing machine, said sprocket rotating about a vertical axis, said chain comprising a plurality of groups of chain pins, each group having a lead pin, a middle pin, and a trailing pin, a plurality of links connecting adjacent pins, a plurality of studs each connected to a respective said middle pin, each stud having a bore therethrough defining a pivot axis parallel to the direction of chain travel, a plurality of hooks each having a normally vertical shank with an upper end extending laterally horizontally into a respective said bore of a respective said stud in pivotal relation, and having a lower distal hook end, a cam at said loading station camming said hooks upwardly to an upwardly cammed position receiving said strand at a reference loading point at said loading station, said first, second and third chain pins of each group lying in a straight rectilinear line at said loading station.

2. The conveyor chain according to claim 1 wherein said first, second and third chain pins of a first group define a first straight rectilinear line, said third chain pin of said first group and the first chain pin of a second group define a second straight rectilinear line, and wherein the angle between said first and second lines is less than 180 degrees.

3. The conveyor chain according to claim 2 wherein said angle between said first and second lines is 160 degrees.

4. The conveyor chain according to claim 3 wherein the first, second and third chain pins of said second group lie along a third straight rectilinear line, and wherein the angle between said first and third lines is 140 degrees.

5. A conveyor chain for a system for processing an elongated strand of food product in a casing having tubular segments serially joined by pinched connection segments, said conveyor chain traversing in a horizontal plane around a sprocket at a strand loading station adjacent a discharge station of a strand producing machine, said sprocket rotating about a vertical axis, said chain comprising a plurality of chain pins connected by respective links, some of said chain pins having respective studs connected thereto, each stud having a bore therethrough defining a pivot axis parallel to the direction of chain travel, a plurality of hooks each having a normally vertical shank with an upper end extending laterally horizontally into a respective said bore of a respective said stud in pivotal relation, and having a lower distal hook end, a cam at said loading station camming said hooks upwardly to an upwardly cammed position receiving said strand at a reference loading point at said loading station, said sprocket having a plurality of teeth separated by roots and engaging said chain pins, the roots at the chain pins having a stud being of deeper radial depth than the remaining roots.

6. The conveyor chain according to claim 5 wherein said studs are mounted to every third of said chain pins.

7. The conveyor chain according to claim 6 wherein said chain comprises a plurality of groups of chain pins comprising three pins per group, comprising a lead pin, a middle pin, and a trailing pin, the root at said middle pin having said deeper radial depth.

8. The conveyor chain according to claim 7 wherein said sprocket has a plurality of groups of roots, each group of roots comprising a first root receiving leading and trailing chain pins therein with no tooth therebetween, and a second root receiving said middle chain pin therein, said first root having a greater circumferential width than said second root, said second root having a greater radial depth than said first root.

9. A conveyor chain for a system for processing an elongated strand of food product in a casing having tubular segments serially joined by pinched connection segments, said conveyor traversing in a horizontal plane around a sprocket at a strand loading station adjacent a discharge station of a strand producing machine, said sprocket rotating about a vertical axis, said chain comprising a plurality of chain pins connected by respective links, a plurality of studs connected to selected chain pins, each stud having a bore therethrough defining a pivot axis parallel to the direction of chain travel, a plurality of hooks each having a normally vertical shank with an upper end extending laterally horizontally into a respective said bore of a respective said stud in pivotal relation, and having a lower distal hook end, a cam at said loading station camming said hooks upwardly to an upwardly cammed position receiving said strand at a reference loading point at said loading station, a plurality of hook orientation mechanisms orienting said hooks in identical orientation at said reference loading point and presenting said hooks at said reference loading point at identical arrival time spacings between adjacent hooks for a given constant rotation speed of said sprocket, such that a respective said pinched connection segment aligns with a respective said hook without varying the speed of said conveyor nor the discharge rate of said strand producing machine.

10. The conveyor chain according to claim 9 comprising a position sensor adjustably mounted to said sprocket for indicating angular position thereof for synchronizing alignment of said pinched connection segments and said hooks.

11. The conveyor chain according to claim 9 wherein said chain comprises a plurality of groups of chain pins, each group having a leading pin, a middle pin, and a trailing pin, each said stud being connected to a respective said middle pin, and wherein said hook orientation mechanisms comprise sprocket and pin engagement aligning said leading, middle and trailing chain pins of each group in a straight rectilinear line at said loading station.

12. The conveyor chain according to claim 9 wherein said sprocket has a plurality of teeth separated by roots and engaging said chain pins, and said hook orientation mechanisms comprise deeper radial depth roots at chain pins having a stud than the remaining roots not having a stud.

13. A conveyor chain comprising a plurality of groups of chain pins, each group having a lead pin, a middle pin, and trailing pin, a plurality of links connecting adjacent pins, a plurality of studs, each stud connected to a respective middle pin and having a bore therein defining a pivot axis, said middle pin extending axially along a pin axis between first and second distally axially spaced said links, said middle pin extending from said second link in a first axial direction towards said first link, said stud extending from said middle pin at said second link in a second axial direction opposite to said first axial direction.

14. The conveyor chain according to claim 13 wherein said bore is axially spaced from said second link along said second axial direction.

15. The conveyor chain according to claim 14 wherein said pivot axis defined by said bore is transverse to said pin axis.

16. The conveyor chain according to claim 15 wherein said pin axis extends vertically, said stud extends downwardly from said middle pin at said second link, and said bore and said pivot axis extend horizontally.

17. The conveyor chain according to claim 16 wherein said bore is provided for receiving a hook having a normally vertical shank with an upper end extending laterally horizontally into said bore in pivotal relation and in depending relation from said stud.

18. A conveyor chain comprising a plurality of groups of chain pins, each group having a lead pin, a middle pin, and a trailing pin, a plurality of links connecting adjacent pins, a plurality of studs, each stud connected to a respective said middle pin and having a bore therein defining a pivot axis, said middle pin extending axially along a pin axis between first and second axially distally spaced said links, said middle pin extending from said second link in a first axial direction towards said first link, said stud extending from said middle pin at said second link in a second axial direction opposite to said first axial direction, said bore being axially spaced from said second link along said second axial direction, said pivot axis defined by said bore being transverse to said pin axis and parallel to the direction of chain travel.

19. A conveyor chain comprising a plurality of groups of chain pins, each group having a lead pin, a middle pin, and a trailing pin, a plurality of studs, each stud connected to a respective said middle pin and having a bore therein defining a pivot axis, a plurality of sets of chain links, each link connecting adjacent pins, each set having a pair of upper and lower leading links, a pair of upper and lower middle links, and a pair of upper and lower trailing links, said upper and lower leading links having leading and trailing portions respectively connecting said lead pin of a first said group and a middle pin of said first group, a first said stud being mounted to said middle pin of said first group at said trailing portion of said lower leading link and extending downwardly therefrom, said upper and lower middle links having leading and trailing portions respectively connecting said trailing pin of said first group and said leading pin of a second said group, said upper and lower trailing links having leading and trailing portions respectively connecting said middle pin of said second group and said trailing pin of said second group, a second said stud being mounted to said middle pin of said second group at said leading portion of said lower trailing link and extending downwardly therefrom.

20. The conveyor chain according to claim 19 wherein said middle pin of said first group defines a first vertical pin axis, said middle pin of said second group defines a second vertical pin axis parallel to said first vertical pin axis, said bore in said first stud is vertically axially spaced below said trailing portion of said lower leading link and defines a first pivot axis transverse to said first vertical pin axis, and said bore in said second stud is vertically axially spaced below said leading portion of said lower trailing link and defines a second pivot axis transverse to said second vertical pin axis.

21. The conveyor chain according to claim 20 wherein each of said first and second pivot axes is parallel to the direction of chain travel.

22. The conveyor chain according to claim 20 wherein each of said bores in each of said studs is provided for receiving a respective hook having a normally vertical shank with an upper end extending laterally horizontally into a respective said bore of a respective said stud in pivotal relation and in depending relation from the respective said stud.

* * * * *